US005866890A

United States Patent [19]

Neuner

[11] Patent Number: 5,866,890

[45] Date of Patent: Feb. 2, 1999

[54] DEVICE AND METHOD FOR SEQUENCING PARICIPATION IN A POINT-OF-SALE ACTIVITY

[76] Inventor: Diana M. Neuner, 1190 Encinitas Blvd. #158, Encinitas, Calif. 92024

[21] Appl. No.: 783,755

[22] Filed: Jan. 16, 1997

[51] Int. Cl.[6] ................................ G06K 5/00; G06K 7/01

[52] U.S. Cl. ........................................ 235/381; 235/382.5

[58] Field of Search .................................... 235/380, 382, 235/381, 382.5, 492; 340/825.31, 825.34

[56] References Cited

U.S. PATENT DOCUMENTS

| | | | |
|---|---|---|---|
| 3,641,553 | 2/1972 | Lau | 340/825.31 |
| 3,999,042 | 12/1976 | Silverman et al. | 235/382 |
| 4,247,759 | 1/1981 | Yuris et al. | 235/381 |
| 5,502,806 | 3/1996 | Mahoney et al. | 235/382 |

*Primary Examiner*—Thien Minh Le

[57] ABSTRACT

In a device for sequencing a point-of-sale activity, identifiable tokens are used to orderly queue participation. The device announces a token identifier for a next participant, and the participant deposits a token into a token input. A token reader reads the identifier from the deposited token, and a comparator compares it to a previously announced identifier. If the identifiers match, the comparator directs the point-of-sale activity to start. Additionally, a method for queuing a point-of sale activity that includes the steps of dispensing a token having an identifier, placing that identifier in a First-in-First-out buffer, advancing the buffer each time a new participant is needed, announcing that identifier, accepting a token, reading the identifier from that token, matching that identifier to the one announced, and activating the point-of-sale activity.

17 Claims, 5 Drawing Sheets

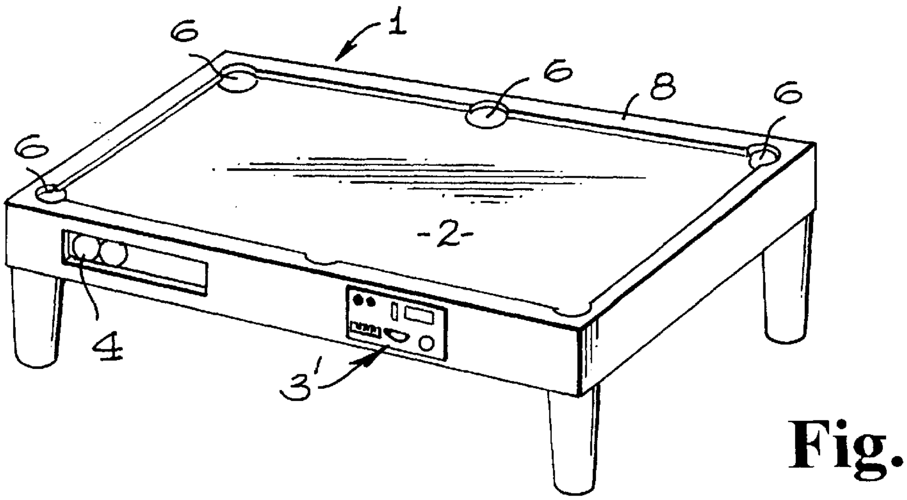
Fig. 1
Fig. 1a
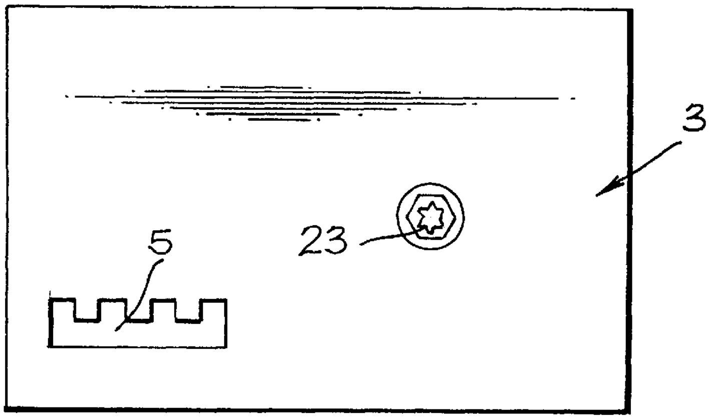
Fig. 3
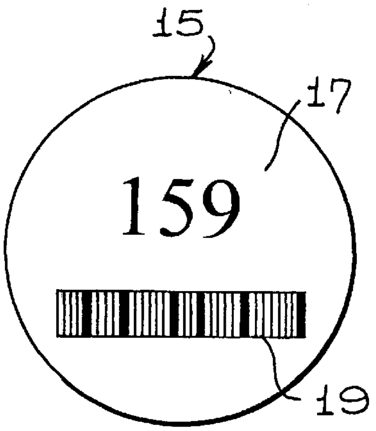
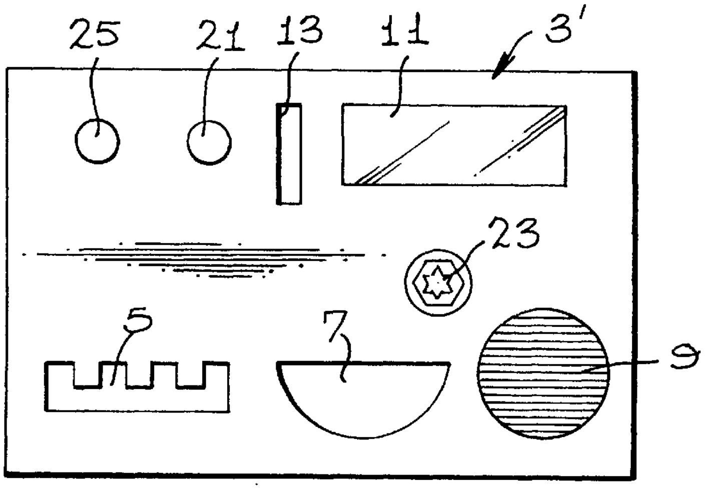
Fig. 2

DEVICE AND METHOD FOR SEQUENCING PARICIPATION IN A POINT-OF-SALE ACTIVITY

FIELD OF THE INVENTION

The field of the present invention is electrical or mechanical devices for controlling point-of-sale activities.

BACKGROUND OF THE INVENTION

The United States, along with many countries in the world, relies on a first-come first-served basis for organizing people's behavior in society. First-come, first-served simply means that an earlier requester for a service or product will receive that service or product before any subsequent requestor. This concept is alternatively called queuing, with queuing being the process of 1) aligning requests first to last and then 2) servicing a request in the order received. First-come, first-served works well in organizing society's behavior except when someone either ignores or intentionally violates these informal rules. Nowhere is the first-come, first-served rule more likely to break down as it is in a point-of-sale activity.

A point-of-sale activity is a consumer activity where an individual desires to purchase a particular good or service. Some examples are: waiting at a service counter at the local hardware store, waiting to pay at a bank or department store customer service center, or waiting to purchase gasoline. Point-of-sale also includes using unattended machines such as those in laundromats, car washes, and other facilities using vending machines. Point-of-sale machines also include gaming devices such as pool tables, pinball machines and video poker machines.

For attended point-of-sale activities, retailers often resorted to the "take-a-number" system. In such a system, for example, a person approaches a centralized repository of numbers, retrieves the next available number, and waits until that number is called or displayed. Consumers who approached the counter earlier have lower numbers and therefore are called for service prior to this person's number. Consumers approaching later have a higher number, so they will be called after this person is called. Such systems work well but require an attendant or clerk to monitor and assure the system is properly implemented and enforced.

Vending machines present a more difficult problem for the first-come, first-served rule. Since there is generally no attendant or clerk, individual consumers must rely on the honesty and integrity of the others desiring the same service or product. Unfortunately, others often misinterpret, misunderstand or accidently misapply the first-come, first-served rule, resulting in heightened tensions and dissatisfied consumers.

A particular type of point-of-sale vending system is a gaming system such as pool tables. These systems are often present in recreational environments such as lounges, sports bars, nightclubs and other recreational centers. Such environments are often loud and confusing, thus contributing to the failure of people to successfully apply the first-come, first-served rule. For example, the game of pool is often started by inserting quarters into a money slot, activating the drop of balls that begins a game. Only one game may be played at a time with no method of queuing built into the pool gaming system. Therefore, in an environment where several people wish to play pool, those desiring to participate will place their quarters on the rail of the pool table or write their name on a chalkboard and await their turn. After the current game ends, someone will (hopefully) announce that the game is over. The persons having quarters nearest the money slot or who are next on the chalkboard will insert their quarters and begin the next game. Unfortunately, in this often confused and active environment participants forget whose quarters are next or may intentionally try to advance their order. Such behavior results in heightened tensions and sometimes even violence.

It is, therefore, the object of the present invention to provide an easy-to-use device and method for sequencing point-of-sale activities, including vending machine activities such as pool.

SUMMARY OF THE INVENTION

In a first separate aspect of the invention, the invention is a device for sequencing participation in a point-of-sale activity. The device uses a plurality of tokens with each token having an identifier. This device has a sequence accumulator comprising a first-in-first-out (FIFO) buffer that holds at least a first identifier and communicates to a sequence announcer. An advance commander communicates to the sequence accumulator and advances the FIFO buffer. A token input receives a token that has a second identifier and this second identifier is read by a token reader. The token reader communicates the second identifier to a comparator with the comparator additionally getting the first identifier from the top of the FIFO buffer. If these two identifiers match, then the comparator activates the point-of-sale activity.

In a second separate aspect, the first aspect is further contemplated having a token dispenser for dispensing tokens.

In a third separate aspect, the second aspect is further contemplated having a money input and a money verification mechanism that communicates a paid and unpaid status to the token dispenser, whereby the token dispenser dispenses a token only when the paid status is received.

In a fourth separate aspect of the invention, the invention includes a method for sequencing a point-of-sale activity using the following steps: dispensing a first token, placing a first token identifier into a FIFO buffer, advancing the buffer, announcing the first identifier, accepting a token, reading the identifier from the token, matching the token identifier to the one at the top of the FIFO buffer, and then activating the point-of-sale activity.

BRIEF DESCRIPTION OF THE DRAWINGS

FIG. 1 shows a perspective view of a coin-operated pool table showing a play control center.

FIG. 1*a* shows the front panel of the play control center for the coin-operated pool table.

FIG. 2 shows the front panel for the play control center of a preferred embodiment.

FIG. 3 shows a token of a preferred embodiment with a bar-coded token identifier.

DESCRIPTION OF THE PREFERRED EMBODIMENTS

Figure 4:
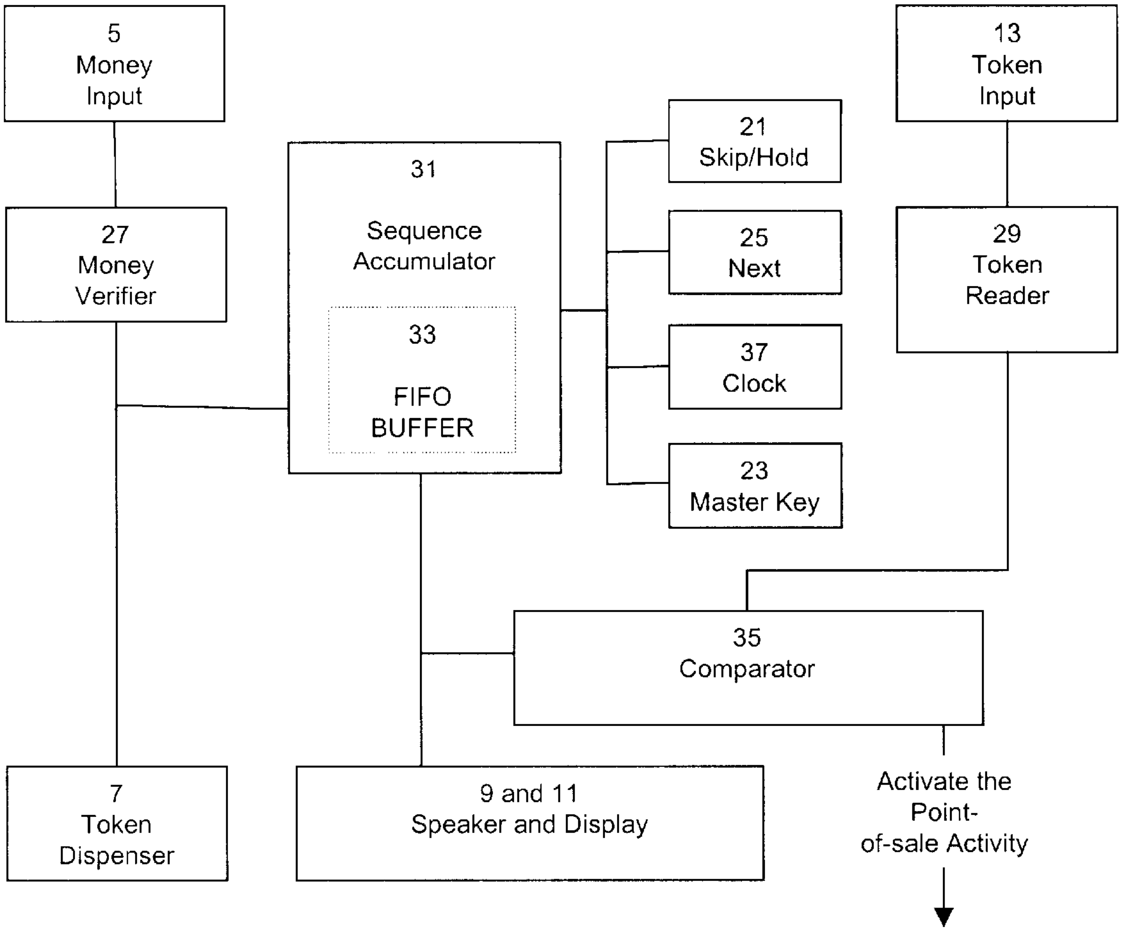
FIG. 4 shows a block diagram of how a preferred embodiment of the invention operates on a coin-operated pool table.

A preferred embodiment of the present invention is a device and method for the orderly sequencing of play on a coin-operated pool table. This preferred embodiment allows several participants to deposit money into a coin-operated pool table while still retaining their first-come, first-served order. Such ordering makes participation in the game of pool more orderly and, therefore, less tense and more enjoyable. The preferred embodiment also has several other advantages which will be discussed herein.

In commercial establishments, the game of pool is often played using a coin-operated pool table such as the one shown in FIG. 1. The standard coin-operated pool table 1 is shown having a standard play control center 3. The pool table has a playing surface 2, ball slot 4, rails 8 and pockets 6.

In using the coin-operated pool table 1, a person desiring to play pool deposits coins into the play control center 3 of the table, activating the game. As the game is played, balls fall into the pockets 6 and are held by the table for the remainder of the game. When the game is complete, the participant relinquishes the table to the person who is next in line to play. At that point, the next person places his or her coins into the play control center 3 activating the table so he or she can begin play. Thus, one is not assured an order of play until the coins are placed into the table and the game has begun.

FIG. 1*a* illustrates an enlarged front panel for a standard play control center 3. The standard coin-operated play control center has controls such as the money input 5 and the master key slot 23. Each control is discussed below.

The money input 5 may accept coins, bills or credit cards or other monetary instruments. The money input 5 often is a slide-in tray which does not need a coin return. Alternatively, the money input 5 can be a slot or bill receptor where a coin return may be needed.

The master key slot 23 is used by the operator of the pool table to remove money periodically, to perform maintenance, or to adjust settings of the coin-operated pool table 1.

FIG. 2 is an enlarged view of the play control center 3 modified to accommodate the preferred embodiment. The preferred embodiment adds several features to the play control center 3. These controls typically include a token dispenser 7, a token input 13, an announcer speaker 9, an announcer display 11, a "Next" button 25, and a "Hold" button 21. Each control is discussed below.

In the preferred embodiment the game is not immediately activated when a participant deposits money into the money input 5. Instead, when the proper amount of money is inserted into the money input 5, an ordered token is dispensed through the token dispenser 7. This token has a number that correlates to a position in the order of play.

When the current players have ended the game and it is time to advance to the next players, the current players will press the "Next" button 25. Pressing the "Next" button 25 advances the preferred embodiment to announce the next participant in the pool game.

The preferred embodiment makes the announcement in two ways. First, the announcer speaker 9 uses a computer synthesized voice to announce the number or other identifier for the next participant. Second, the announcer display 11 visually displays the number or other identifier for the next participant. This display may also present additional information to the players such as how long their game has been playing, storing, comparing and displaying time to compare other players' times, the current time, or other information as chosen by the operator of the pool table. After the next participants are announced, they have only a limited period of time or wait-time in which to deposit their token. This wait-time is set and adjusted by the operator of the pool table. When notified that their position is available, but, for some reason the participants are not able to make it to the table in the allotted time they, or someone else, may press the "Hold" button 21. The "Hold" button 21 may be pressed once to extend the wait-time for the next participant to deposit their token into the token input 13.

The token input 13 is a slot for accepting a token from a would-be participant. If the deposited token is the correct token, that is, it corresponds to the announced number, then the play control center 3 retains the token and activates the next game. However, if the token is incorrect, or is deposited at the wrong time (i.e., out of sequence), then the token is returned through the token dispenser 7 and play is not affected.

Besides the external controls added to the play control center 3, several additional internal components are required. These components are identified in the block diagram of FIG. 4, and include a money verifier 27, a token reader 29 a sequence accumulator 31, a First-in, First-Out (FIFO) buffer 33, a comparator 35, and a clock 37. Each component is discussed below.

After money is inserted into the money input 5, the money verifier 27 assures that the proper coins or bills have been inserted. Money verification is well known in the art and both mechanical and electrical devices currently exist for performing this function.

Before continuing to describe the controls and components, the token needs further description. The token 15 of the preferred embodiment, shown in FIG. 3, contains two related identifiers. The first identifier is the token number 17 which visually displays to the participant an order number. This number will be announced over the speaker 9 and shown on the display 11 when it is that token holder's turn to play. The other identifier on the token 15 is the token bar code 19, which corresponds to the token number 17, but is readable by a bar code scanner.

In the preferred embodiment, tokens are sequentially numbered and dispensed in this sequential order. Although a strict sequential order is not necessary, using such an order simplifies the process of acclimating new users to the system. In an establishment with more than one table, the token identifier contains an additional alpha character that acts as a token identifier. For example "A005" would be announced on the "A" table, whereas "B005" would be announced on the "B" table.

When the token 15 is inserted into the token input 13, the token bar code 19 is read by the token reader 29. It is thus possible to automatically identify each token that is input. Small bar code readers are well-known in the industry and are easily adaptable for such usage. Although the bar code identifier 19, as shown in FIG. 3, is only shown on the front in a single location, for ease of reading the bar code mark may be repeated several times on both sides or may even be applied to the rim of the token 15. Additionally, those skilled in the art will recognize several machine-readable identifiers available as an alternative to a bar code.

The sequence accumulator 31 is responsible for the orderly sequencing of the token identification numbers 17. Each time a token is dispensed, the sequence accumulator contains a FIFO buffer 33 that places that token's identifier into the FIFO buffer 33. Since the tokens are generally sequentially dispensed, the sequence accumulator 31 simply places the next sequential number into the FIFO buffer 33 each time a token is dispensed. As games progress, the sequence accumulator 31 assures that all prior token numbers have been allowed an opportunity to play before a later number is announced.

The comparator 35 is used to compare the identifier of a deposited token to the identifier that is correctly announced. The comparator 35 thus assures that the identifier on the inserted token corresponds to the identifier at the top of the FIFO buffer 33 before activating the game. The identifier on a token is sent to the comparator 35 after a token is input into the token input 13 and its bar code identifier 19 is read with the token reader 29. The comparator 35 also receives the identifier from the top of the FIFO buffer 33, which correlates to the token that has been announced. The comparator 35 compares these two identifiers, and if they match, retains the token and activates the next game. If they do not match, the token is returned and play is not affected.

The play control center 3 may also contain an internal clock 37. The internal clock 37 may not only track and display the current time but may contain one or more timers for timing the current length of play and the wait-time for allowing an announced participant to deposit the correct token. The internal clock 37 can also be set to automatically shut off the tables at a certain set time thereby eliminating problems at closing hour.

Additional internal components may be added to obtain additional features for the coin-operated pool table. The individual internal components listed are all well-known in the industry.

In this preferred embodiment, the sequence accumulator 31, FIFO 33, and the comparator 35 are implemented as a microprocessor. Those skilled in the electro-mechanical art will recognize several alternatives to the physical implementation of the components in the preferred embodiment. The interconnection of the various components is now discussed while referring to FIG. 4.

FIG. 4 has a block diagram showing the interrelation between the various controls and components of the preferred embodiment. The money input 5 is connected to the money verifier 27 which is connected to the token dispenser 7. When money is input into the money input 5 and the quantity is verified by the money verifier 27, a token is dispensed from the token dispenser 7. Simultaneously the identifier from that token is placed in the FIFO buffer 33 of the sequence accumulator 31. Thus, the last token dispensed will be the last identified token in the FIFO buffer 33. The token identifier on the top of the FIFO buffer 33 will be the number for the next ordered participant.

The operator of the pool table may optionally set a maximum play time for each game, thus assuring that no one participant is allowed to overextend play time. Thus, the current game may end when play time has run out according to a timer on the clock 37 or alternately, when a participant presses the "Next" 25 button.

Therefore, either the clock 37 or the "Next" button 25 will notify the sequence accumulator 31 to advance the FIFO buffer 33 and announce the next identifier. Then, the speaker 9 will announce the token identifier that is at the top of the FIFO buffer 33, with the identifier also appearing on the display 11. Simultaneously, a wait-timer in clock 37 will begin that gives a participant a set amount of time to respond by inserting the correct token. If additional wait-time is needed, pressing the "Hold" button 21 resets the wait- timer in the clock 37, giving the participant additional time in which to respond. However, wait-time can only be extended once. The operator of the pool table can adjust the amount of wait-time and whether or not the "Hold" button 21 is activated.

After a token identifier is announced, a would-be participant approaches the Play Control Center 3 and inserts the token 15 into the token input 13. The token 15 drops into the token reader 29 where the token bar code 19 is read by the token reader 29. The token reader 29 then passes the token identification number 17 to the comparator 35. The sequencer accumulator 31 also communicates a token identification 17 from the top of the FIFO buffer 33 to the comparator 35. The comparator 35 compares these two token identifiers. If the identifiers match, then the correct token was deposited. If not, the token is returned to the would-be participant through the token dispenser 7. If it is the proper token, the token is retained and the comparator 35 notifies the pool table to begin the next game. For example, the token input 15 may be similar to a sliding coin tray used in conventional coin-operated pool tables. When the token is placed on the tray and inserted, if the correct token is present, the slide-in tray is allowed to continue its inward travel, causing the balls to be released for play. If an incorrect token is present, then the tray is stopped, play is not started, and the token may be removed.

Figure 5:
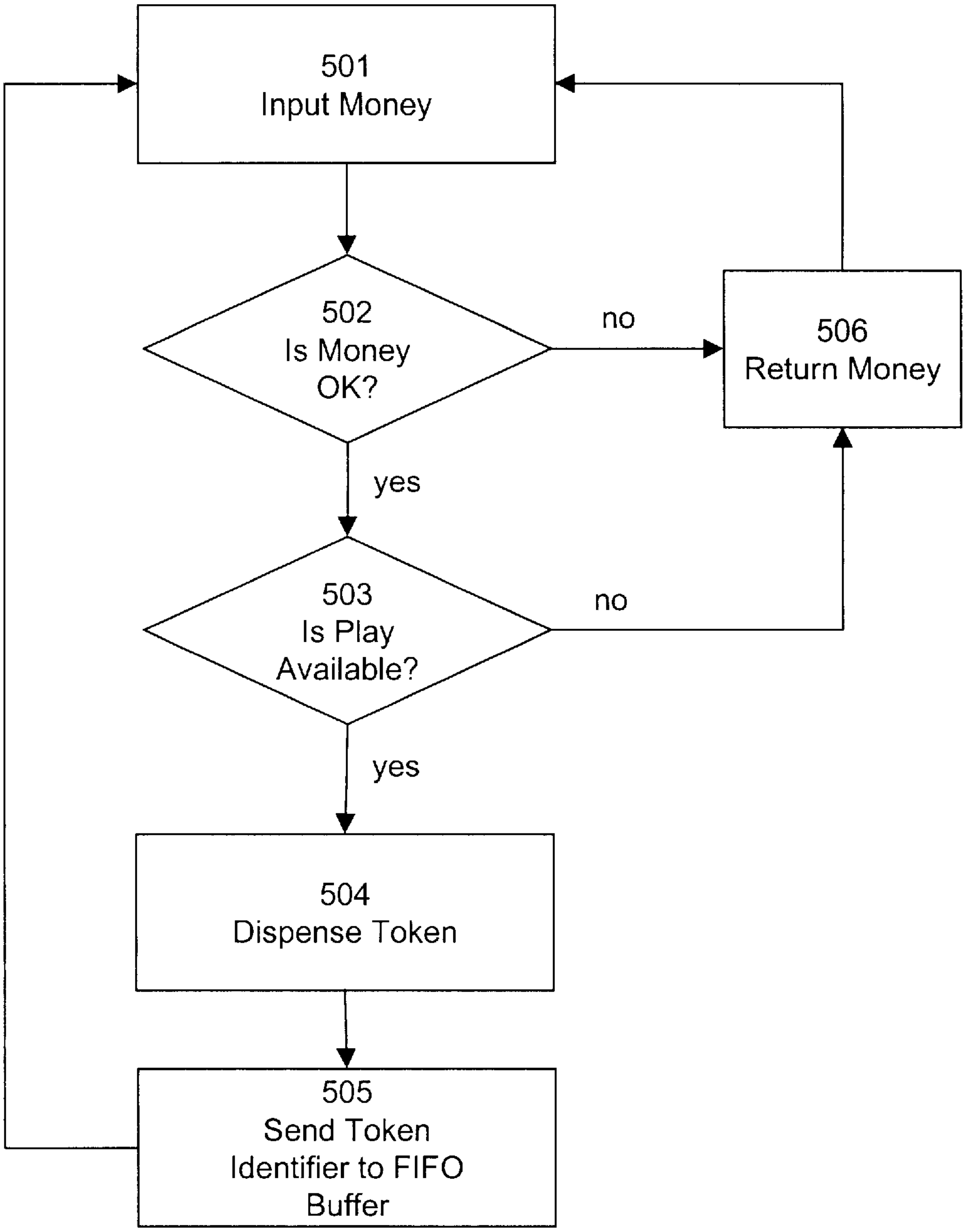
FIG. 5 shows the token dispensing logic for a preferred embodiment of the invention.

FIG. 5 shows the logic that the preferred embodiment uses to determine when to dispense a token 15. Block 501 shows money input into the preferred embodiment. In block 502, the quantity of money is verified. If the money is not correct, the money will be returned in block 506 to the would-be participant. If the money is correct, block 503 then asks if play is still available on the pool table. The operator of the pool table can set the preferred embodiment to stop dispensing tokens after a set time or after a set number of tokens have been dispensed. Thus, the operator of the pool table has control over the queuing of additional games. If there are no plays available, the money is returned in block 506 to the would-be participant. If a play is available, then in block 504 a token is dispensed to the would-be participant, with that token having a unique identifier that assures a particular order of play. As shown in block 505, that token identifier is placed in the FIFO buffer 33 of the sequence accumulator 31.

Figure 6:
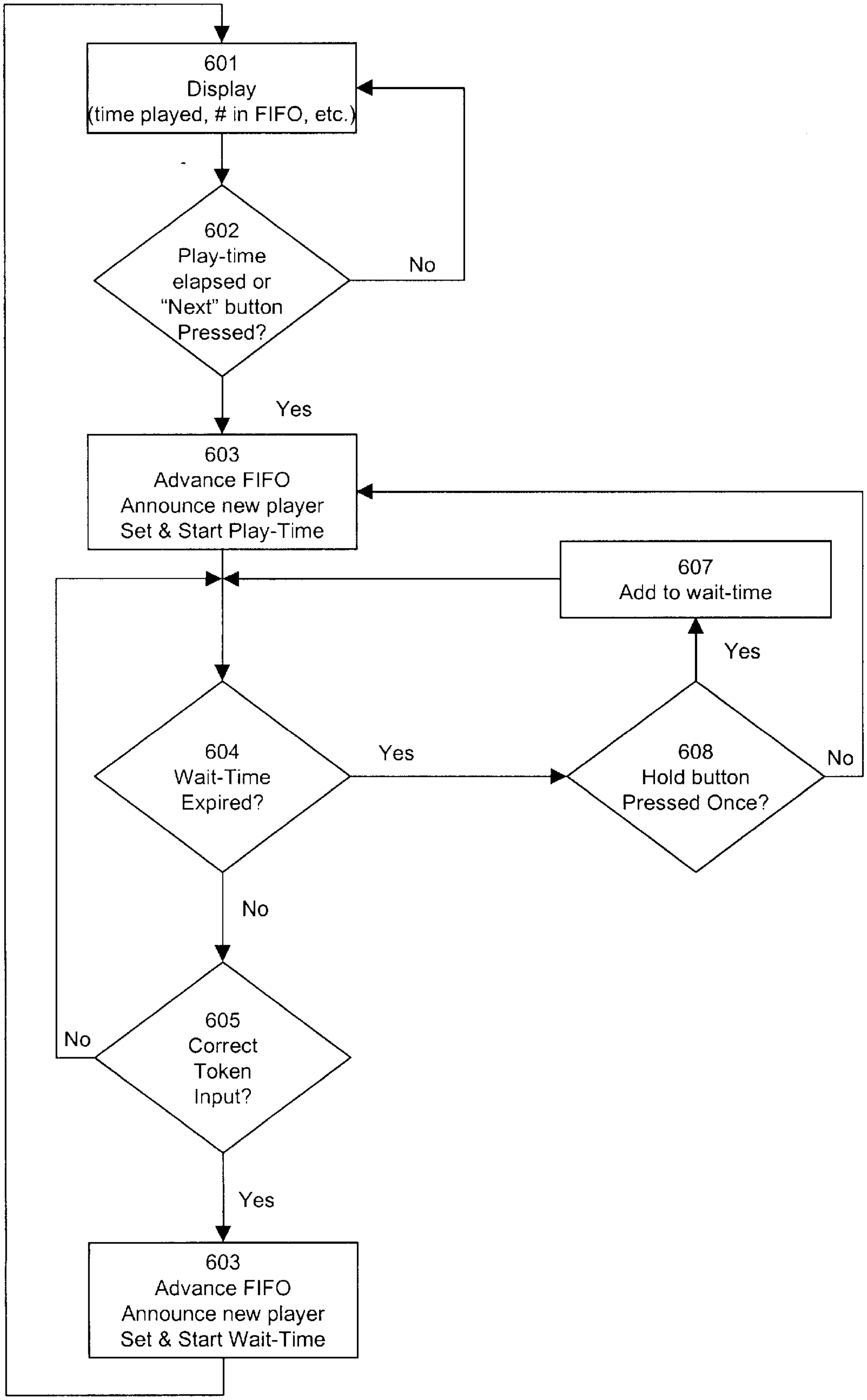
FIG. 6 shows the game activation logic for a preferred embodiment of the invention.

FIG. 6 shows the logic of the preferred embodiment for determining when to begin the next game. Blocks 601 and 602 represent the idle function of the preferred embodiment while a game is being played. In block 601 the display is used to show the amount of time played in this game, the next number to be called for participation, or other information as selected by the operator of the pool table. Block 602 asks whether the optional play time has elapsed or the "Next" button has been pressed. The operator of the pool table may set a maximum play time that automatically ends a game if that maximum time is reached. When the maximum time has elapsed, the system will automatically advance to the next participant. Alternatively, the current participants may manually advance to the next game by pressing the "Next" button. If either of the above two events has occurred, then block 603 will advance the FIFO buffer and announce the identifier of the next participant.

When the new participant is announced, a wait-timer is started that sets the time that a would-be participant has to respond by inserting the correct token. Block 604 checks the wait-time, and if the wait-time has not expired, then block 605 looks to see if the correct token has been inserted into the token input 13.

If the correct token has not been input, then block 604 is again used to check if the wait-time has expired. Once wait-time has elapsed, then block 608 checks if the "Hold" button has been pressed only once. The "Hold" button, if activated by the operator of the pool table, allows a would-be participant or another person to extend the wait period once. By pressing the "Hold" button once, a short extension of time will be granted in block 607, giving the would-be participant some additional time to respond. When wait-time or extended wait-time runs out and the correct token has not been deposited, then block 603 will advance the FIFO buffer to the next player, announce the identifier for the next participant, and reset the wait-timer. Since there is now an outstanding token that has been announced but not deposited, the preferred embodiment may 1) void that token with the participant thus losing any right to play subsequently with that token or 2) may place the unused number at the top of the FIFO buffer. Alternatively, the unused number may be placed at the top of the buffer for a set number of games, and then voided if still unplayed. The operator of the pool table sets the desired options.

If the correct token has been input within the proper wait-time, then block 606 directs that the token is retained, the play timer is set and started, and the game is activated. The logic then moves back to block 601 and waits for the current game to end.

In a second preferred embodiment, an establishment with multiple pool tables may use a centralized system. In such a system, a centralized device has a money input 5 and a token dispenser 7, plus control and communication logic. Each pool table has a token input 13 in its play control center 3. A token dispensed by the centralized token dispenser 7 may potentially be used in any pool table. However, the tables are in communication with the centralized devices, with the control and communication logic sequentially assigning particular tokens to activate particular tables. Thus, a single queue is established for multiple tables. Control and communication logic is well known in the electronic art.

Figure 7:
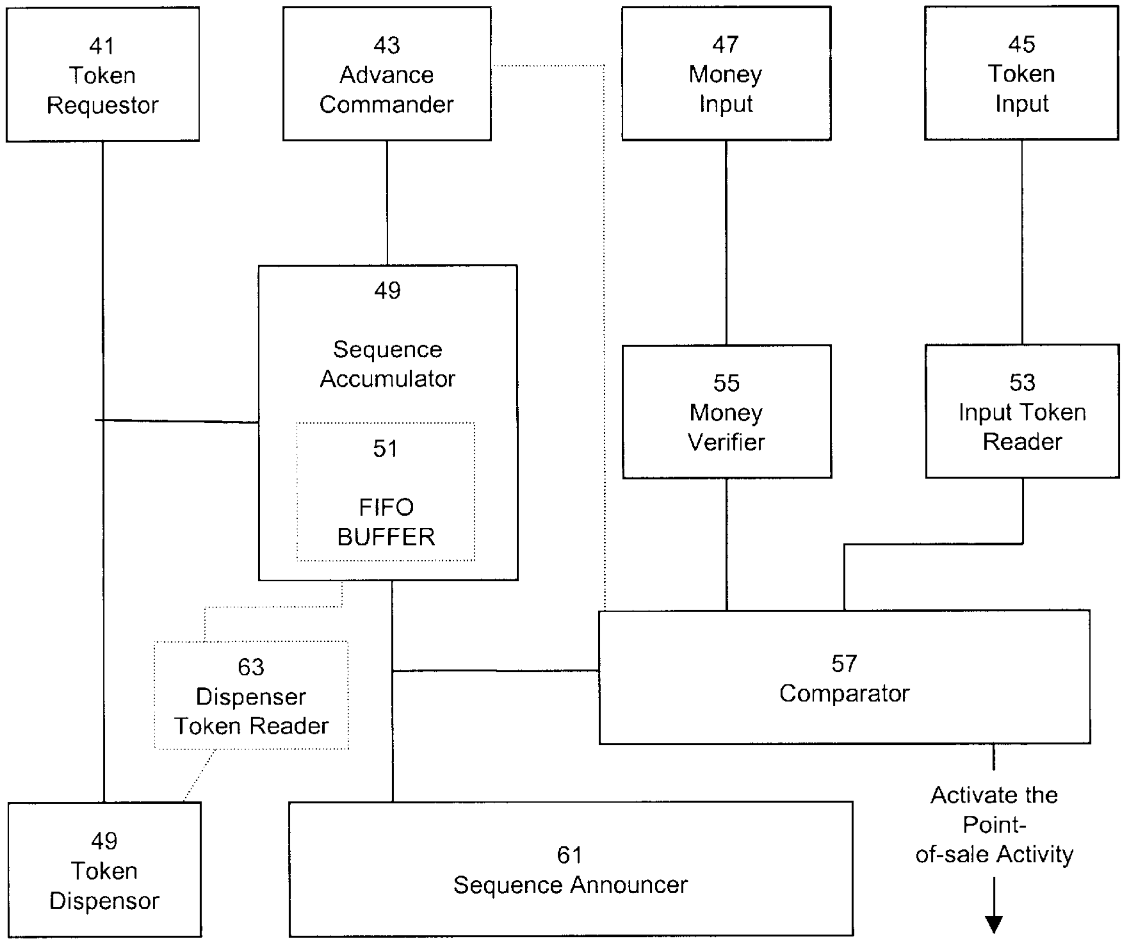
FIG. 7 shows a block diagram for an alternate preferred embodiment of the invention.

FIG. 7 shows a third preferred embodiment for the present invention. This embodiment has more flexibility than the one previously presented, thus having a wider range of applicability. For example, this embodiment may be successfully and advantageously used in both attended and unattended point-of-sale activities such as car washes, laundromats, carnival rides, theater entrances, bank teller attention, or any point-of-sale activity where queuing is desired.

In this preferred embodiment, a token requester 41 communicates directly with a token dispenser 59. The token requester may be a button, a switch communicating to the point-of-sale device or any other component capable of triggering the token dispenser 59. Thus, the point-of-sale device may use any criteria, even human intervention, to activate the token requestor 41 for dispensing a token from the token dispenser 59. Simultaneous with the token being dispensed, a token identification associated with that token is placed in the FIFO buffer 51 of a sequence accumulator 49. An optional dispenser token reader 63 may be used to read non-sequential tokens and send the token identifier to the FIFO buffer 51. Again, the top token identifier in the FIFO buffer 51 is sent to a comparator 57 and to a sequence announcer 61 where that identifier is displayed or announced.

An advance commander 43 decides when to advance the FIFO buffer 51. The advance commander may be connected to the point-of-sale device, to a button under attendant control, or to any external device that can control the pacing of the point-of-sale activity. In the alternate preferred embodiment, a money input 47 connects to a money verifier 55, but the money verifier 55 communicates a paid/unpaid status to the comparator 57. A token input 45 connects to an input token reader 53 that connects to the comparator 57.

In this embodiment the comparator 57 still compares the sequences received from the FIFO buffer 51 and the input token reader 53, but also verifies payment before activating the point-of-sale activity by checking for a paid status. Consequently, in the third preferred embodiment it is not necessary to pre-pay before receiving a token. When the token identifiers match and the comparator 57 verifies that the activity is paid for, then the point-of-sale activity may be activated by the comparator 57.

When the activity ends, the advance commander 43 automatically or manually signals the sequence accumulator 49 to advance the FIFO buffer 51. The comparator 57 communicates with the advance commander 43 resetting for the next activating cycle. The next token identifier is now displayed or announced on the sequence announcer 61.

As can be seen, the third preferred embodiment has several unique features. First, it allows for human intervention, thus accommodating point-of-sale activities that have human attendants. Second, it allows queuing without prepayment. For example, a token may be manually dispensed and given to a participant. The participant then waits for the announcement of that token identification number. When announced, the participant deposits the token into the token input. At that point, the would-be participant also deposits money into the money input. The comparator starts the activity after verifying that the correct token has been deposited and that the full payment has been made. Additionally, a human attendant, through the advance commander, may be able to adjust the sequencing of the FIFO buffer to accommodate particular needs.

All the examples of the present invention have been given in the form of a preferred embodiment and alternative preferred embodiments. The invention is not to be limited or narrowed by these examples, but instead should be limited only by the spirit and intent of the claims.

I claim:

1. A device for sequencing participation in a point-of-sale activity using tokens, where each token has an identifier, comprising:

a sequence accumulator comprising a First-in-First-out (FIFO) buffer for holding token identifiers, including a first identifier at the top of the FIFO buffer;

a sequence announcer communicating to the sequence accumulator, wherein the sequence announcer receives and announces the first identifier;

an advance commander communicating to the sequence accumulator wherein the advance commander advances the FIFO buffer;

a token input for receiving a token having a second identifier;

a token reader for reading the second identifier;

a comparator communicating with the sequence accumulator and the token reader and having an output communicating with the point-of-sale activity, whereby the comparator receives the first and second token identifiers and when the identifiers match, directs the output to activate the point-of-sale activity.

2. The device of claim 1 further comprising:

a token dispenser, a token requester communicating to the token dispenser and the sequence accumulator, wherein activating the token requestor causes the token dispenser to dispense a third token having a third identifier, with the sequence accumulator receiving the third identifier and placing the third identifier in the FIFO buffer.

3. The device of claim 2 further comprising a money input, a money verifier having a paid and unpaid status and communicating to the money input and the comparator, wherein the comparator receives the paid status before directing the output to activate the point-of-sale activity.

4. The device of claim 3 where the money verifier further communicates with the token requestor wherein the paid status activates the token requester.

5. The device of claim 3 wherein the money input receives cash.

6. The device of claim 3 wherein the money input accepts credit cards.

7. The device of claim 2 further comprising a token dispenser reader communicating to the sequence accumulator and reading the third identifier from the third token and communicating the third identifier to the sequence accumulator.

8. The device of claim 1 further comprising a money input, a money verifier having a paid and unpaid status and communicating to the money input and the comparator, wherein the comparator receives the paid status before directing the output to activate the point-of-sale activity.

9. A device for sequencing participation in a billiards game comprising:

a plurality of tokens, wherein each token has an identifier, a sequence accumulator comprising a First-in-First-out (FIFO) buffer for holding token identifiers, including a first identifier at the top of the FIFO buffer;

a sequence announcer communicating to the sequence accumulator, wherein the sequence announcer receives and announces the first identifier;

a next button communicating to the sequence accumulator wherein the next button advances the FIFO buffer;

a token input for receiving a token having a second identifier;

a token reader for reading the second identifier;

a comparator communicating with the sequence accumulator and the token reader and having an output communicating with the game, whereby the comparator receives the first and second token identifiers and when the identifiers match, directs the output to activate the game.

10. The device of claim 9 further comprising:

a token dispenser for dispensing tokens;

a money input comprising a payment verification having a paid and unpaid status, and communicating with the token dispenser, wherein the token dispenser dispenses a token when the token dispenser receives a paid status.

11. The device of claim 9 additionally having a wait timer communicating with the sequence accumulator for advancing the FIFO buffer after a preset time.

12. The device of claim 11 additionally having a hold button communicating to the wait timer for adding additional time to the preset time.

13. The device of claim 9 where the sequence announcer comprises a display.

14. The device of claim 9 where the sequence announcer comprises a speaker.

15. A method for sequencing a point-of-sale activity comprising the steps:

dispensing a token having a first identifier;

placing the first identifier in a First-In-First-Out (FIFO) buffer;

advancing the FIFO buffer each time a new participant is needed for the point-of-sale activity;

announcing the first identifier on a sequence announcer when the first identifier is at the top of the FIFO buffer;

accepting the token;

reading a current identifier from the deposited token;

matching the current identifier to the first identifier;

activating the point-of-sale activity.

16. The method of claim 14 further comprising the step of accepting and verifying payment.

17. The method of claim 14 wherein the point-of-sale activity is billiards.

* * * * *

UNITED STATES PATENT AND TRADEMARK OFFICE

CERTIFICATE OF CORRECTION

PATENT NO. : 5,866,890

DATED : February 2, 1999

INVENTOR(S) : Diana M. Neuner

It is certified that error appears in the above-identified patent and that said Letters Patent is hereby corrected as shown below:

On the title page, item [54] delete "Paricipation and insert --Participation--.

Column 8, line 64, delete "requester" and insert --requestor--.

Column 9, line 12, delete "requester" and insert --requestor--.

Signed and Sealed this

Twenty-second Day of June, 1999

Attest:

Q. TODD DICKINSON

*Attesting Officer* *Acting Commissioner of Patents and Trademarks*